United States Patent
Kim et al.

(10) Patent No.: US 7,213,881 B2
(45) Date of Patent: May 8, 2007

(54) LOCKING DEVICE FOR A DETACHABLE VEHICLE SEAT

(75) Inventors: Jong Ho Kim, Seoul (KR); Chan Ho Jeong, Gwangmyeong (KR)

(73) Assignee: Kia Motors Corporation, Seocho-Ku, Seoul (KR)

( * ) Notice: Subject to any disclaimer, the term of this patent is extended or adjusted under 35 U.S.C. 154(b) by 185 days.

(21) Appl. No.: 10/982,141

(22) Filed: Nov. 5, 2004

(65) Prior Publication Data
US 2005/0062326 A1    Mar. 24, 2005

(30) Foreign Application Priority Data
Nov. 8, 2003    (KR) .................... 10-2003-0078837

(51) Int. Cl.
*B60N 2/04*    (2006.01)
(52) U.S. Cl. ................. 297/336; 296/65.03; 296/65.05
(58) Field of Classification Search ............ 248/503.1; 296/65.05, 65.09, 65.08, 65.03; 297/331–333, 297/335, 336
See application file for complete search history.

(56) References Cited

U.S. PATENT DOCUMENTS

| | | | |
|---|---|---|---|
| 5,498,051 A * | 3/1996 | Sponsler et al. ......... | 296/65.03 |
| 6,012,747 A * | 1/2000 | Takamura et al. .......... | 292/216 |
| 6,065,804 A * | 5/2000 | Tanaka et al. ............. | 297/336 |
| 6,361,098 B1 * | 3/2002 | Pesta et al. .............. | 296/65.03 |
| 2005/0023857 A1 * | 2/2005 | Lavoie ..................... | 296/65.05 |

FOREIGN PATENT DOCUMENTS

JP    10-147168    2/1998

* cited by examiner

*Primary Examiner*—Dennis H Pedder
*Assistant Examiner*—Melissa Black
(74) *Attorney, Agent, or Firm*—Morgan Lewis & Bockius LLP

(57) ABSTRACT

The locking device for a detachable vehicle seat is provided with a special mechanism in a rear end locking part which easily enables checking the locking state of the locking device. The locking device for a detachable vehicle seat includes front and rear end locking parts, which respectively comprises a front main bracket and a rear main bracket, each of which, being connected to a striker, is independently installed at front and rear ends of a leg frame under the seat thereby supporting the leg frame, and is selectively locked/unlocked to a striker fixedly installed inside the cover of the striker by means of lock plates. The locking device also includes a spring member that provides an elastic recovery force so that the leg frame can rotate with respect to the front end locking part in a double-folded state when the rear end locking part is unlocked in a state that the front end locking part is fixedly locked by the striker.

18 Claims, 11 Drawing Sheets

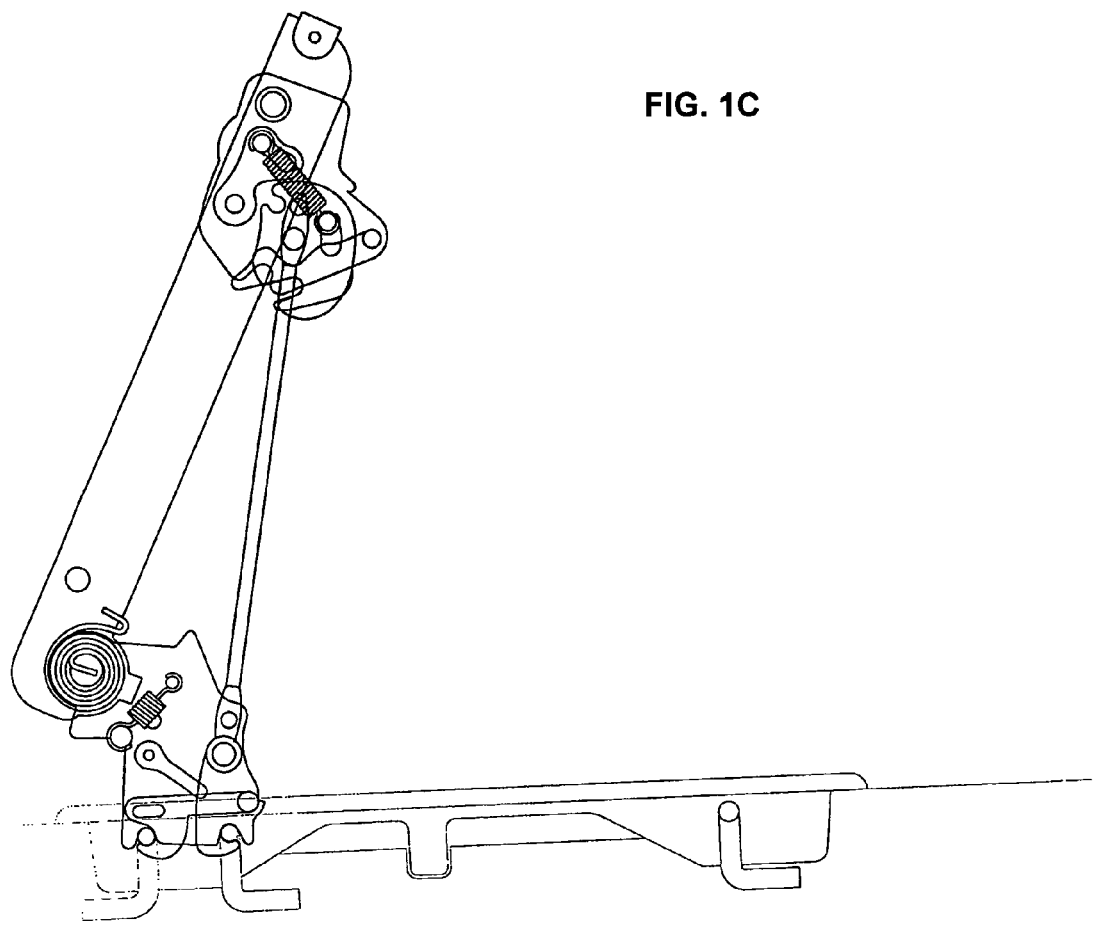
FIG. 1C
FIG. 1D
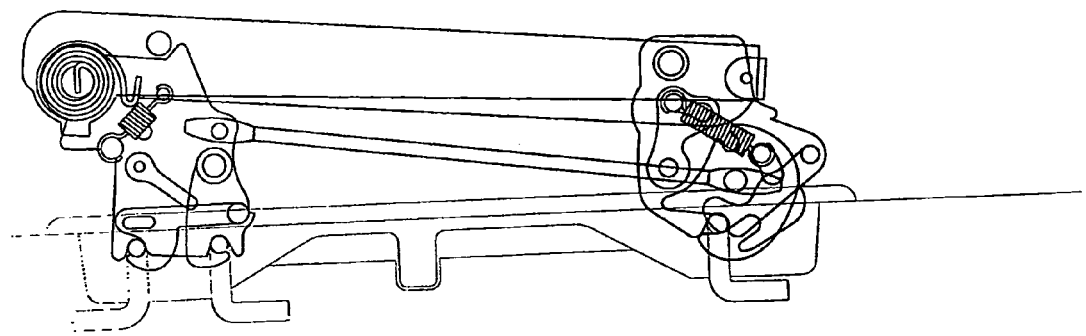

LOCKING DEVICE FOR A DETACHABLE VEHICLE SEAT

CROSS-REFERENCE TO RELATED APPLICATIONS

This application claims priority of Korean Application No. 10-2004-0078837, filed on Nov. 8, 2003, the disclosure of which is incorporated fully herein by reference.

FIELD OF THE INVENTION

The present invention relates to a locking device for a detachable vehicle seat, and in particular to a locking device for a detachable vehicle seat in which a seat is easily attached/detached, and even completely detached and double folded if required. The locking device is provided with a special mechanism in a rear end locking part which easily enables checking the locking state of the locking device.

BACKGROUND OF THE INVENTION

The locking device for a detachable seat of a conventional vehicle has the following problems. Stable locking is not achieved in the front side of the seat. Further, the locking force of the front side of the seat is significantly inferior to that of the rear side of the seat.

In addition, it is not possible to double-fold a seat in the conventional locking device. Therefore, the seat must be fully detached and put aside inside the vehicle or stored out of the vehicle.

Further, in the conventional locking device, it is very difficult to check whether the locking of the locking part provided in the lower side of the seat is fully achieved or not after the seat is locked. Therefore, it often causes injuries to users when suddenly applying brakes or during a vehicle collision.

SUMMARY OF THE INVENTION

The present invention relates to a locking device of a detachable vehicle seat. The locking device includes front and rear end locking parts, which respectively comprise a front main bracket and a rear main bracket. Each bracket is connected to a striker, is independently installed at front and rear ends of a leg frame under the seat thereby supporting the leg frame, and is selectively lockedlunlocked to a striker by means of lock plates. The locking device also includes a spring member that provides an elastic recovery force so that the leg frame can pivot about a rotational axis of the front end locking part in a double-folded state when the rear end locking part is unlocked in a state that the front end locking part is fixedly locked by the striker.

The front end locking part includes a main bracket that is installed in a front end of the leg frame and is tiltable both forward and backward. The front end locking part also includes a recess in which a striker is inserted, and a roller moving along the lower surface of the striker cover. The front end locking part also includes a lock plate that is elastically rotated in the main bracket and is selectively locked and unlocked by the strikers as the striker is fitted into the recess of the main bracket. The front end locking part further includes a spring member that provides an elastic recovery force for maintaining the lock plate in a catching state, and a release lever that is installed so that the lock plate is rotated in the release direction.

The rear end locking part includes a main bracket that is tiltable both forward and backward for thereby being folded at a rear end of the leg frame and has a recess into which the striker is fitted. The rear end locking part also includes a lock plate that is rotated in the main bracket and is locked with the striker by a force when the striker is fitted into the recess of the main bracket, and the striker is fitted into the recess of one side. The rear end locking part further includes a cam which is rotatably installed in the main bracket, and is caught by an engaging step of the lock plate, and limits the rotation of the lock plate in the locking state. The rear end locking part also includes a spring member that is installed between the lock plate and the cam and provides a pulling force for allowing the front end of the cam to be on the engaging step of the lock plate. The rear end locking part includes a release lever of which one end is fixedly installed at the rotation center of the cam, wherein the release lever rotates the cam so that the front end is escaped from the engaging step by a rotation operation when the lock plate is to be unlocked; and a state-indicating part that is operated in cooperation with the rotation of the lock plate and indicates a state of locking/unlocking via an indication hole of the leg frame installed in the outside of the leg frame.

The present invention provides a locking device for a detachable vehicle seat in which it is possible to easily attach or detach a seat, it is possible to fully separate a seat, double folding is available, and a certain mechanism is provided in a rear end locking part for checking a locking state, so that a user can easily check a locked state.

BRIEF DESCRIPTION OF THE DRAWINGS

The aforementioned aspects and other features of the present invention will be explained in the following description, taken in conjunction with the accompanying drawings, wherein:

FIGS. 1A through 1D are views illustrating an engaging procedure of a detachable seat adapting a locking device according to the present invention;

DETAILED DESCRIPTION OF PREFERRED EMBODIMENTS

Figure 1A:
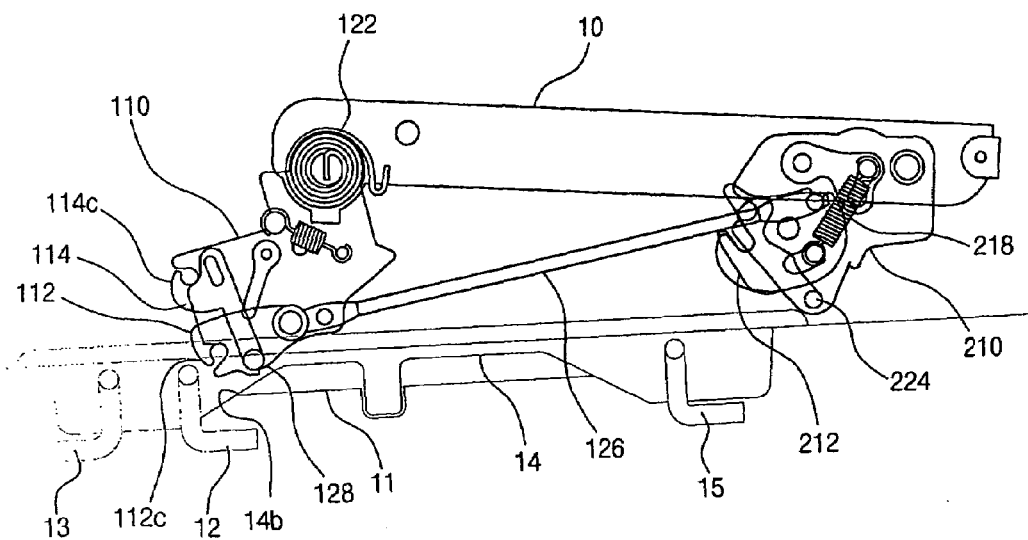

Embodiments of the present invention provide a locking device for a detachable vehicle seat that is capable of overcoming the drawbacks of the conventional art. The present invention is described in details as set forth hereunder.

The present invention is described in greater detail with reference with accompanying drawings as follows. FIGS. 1A through 1D are views illustrating an engaging procedure of a detachable seat adapting a locking device according to the present invention. In the drawings, reference numeral 10 represents a leg frame of a lower side of a seat. A seat cushion is installed on an upper side of the leg frame 10. In each drawing, a seat cushion and a seat back are not shown for simplification.

In addition, in the present invention, a device 100 for locking a front side of a seat is called a front end locking part, and a device 200 for locking a rear side of a seat is called a rear end locking part. Namely, the locking device according to the present invention includes a front end locking part 100, and a rear part locking part 200. The front end locking part 100 and the rear end locking part 200 each include a lock plate for catching strikers. When the rear end locking part 200 is unlocked, the seat is automatically double-folded.

Figure 1B:
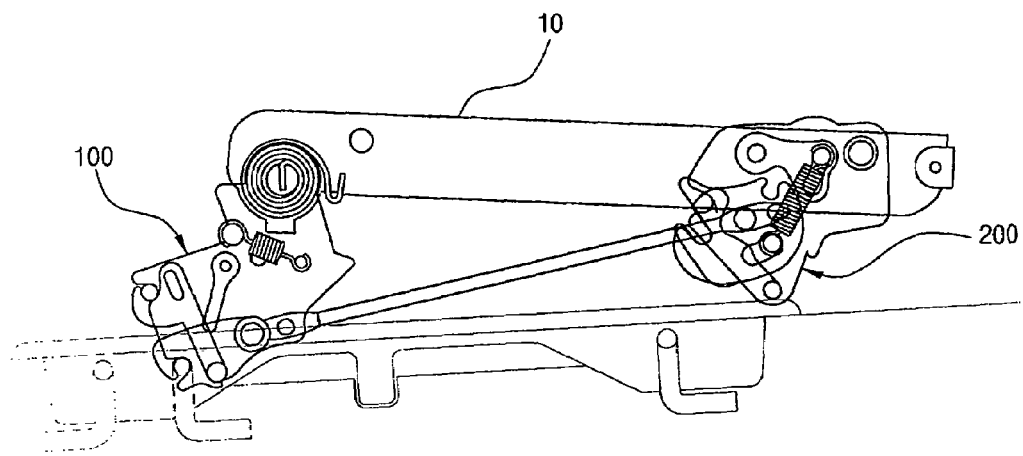

FIG. 1A is a view of a state where the seat is not fixed. FIG. 1B is a view of a state where a first lock plate 112 of the front end locking part 100 catches a striker 12. FIG. 1C is a view of a state where the first and second lock plates 112 and 114 of the front end locking part 100 catch the strikers 12 and 13, and FIG. 1D is a view illustrating a fully fixed state of a seat, namely, illustrating a locking completion state of the front end locking part 100 and the rear end locking part 200.

In particular, FIG. 1C is a view illustrating a state where the leg frame 10 is automatically tilted forward in a state that the first and second lock plates 112 and 114 are locked by two strikers 12 and 13. Namely, there is shown an automatically double-folded state of the seat. The automatic double-folded state of the seat is performed by a spiral spring 122 when unlocking the rear end locking part 200. In other words, FIGS. 1A through 1D are views illustrating an engaging procedure of the seat. Here, FIGS. 1C and 1D show a procedure that the seat is automatically double-folded by the spiral spring 122 by unlocking only the rear end locking part 200.

Figure 2A:
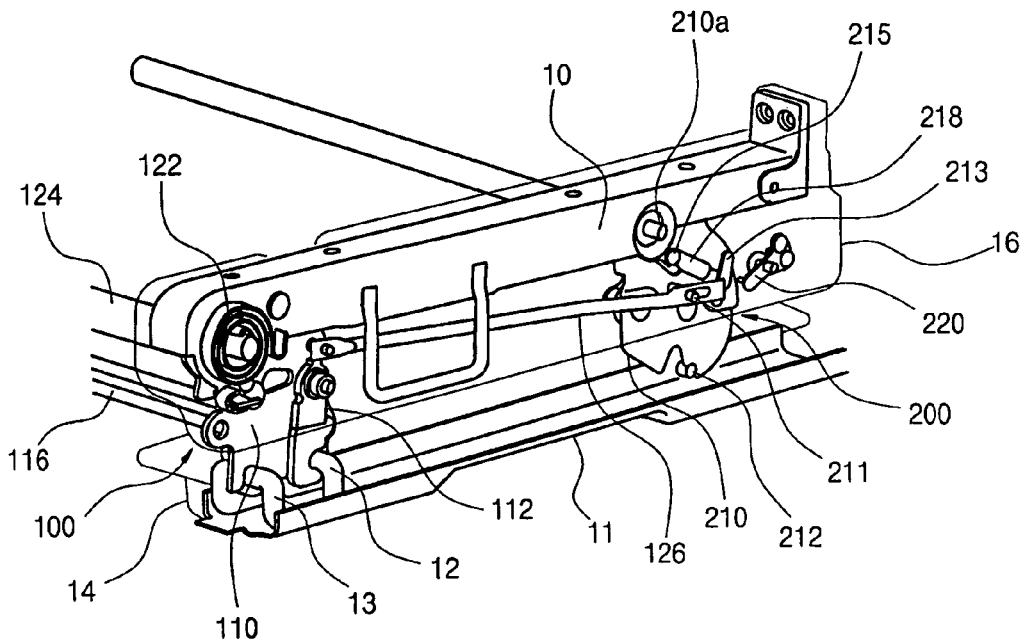
FIGS. 2A and 2B are perspective views illustrating a locking device according to the present invention.
Figure 2B:
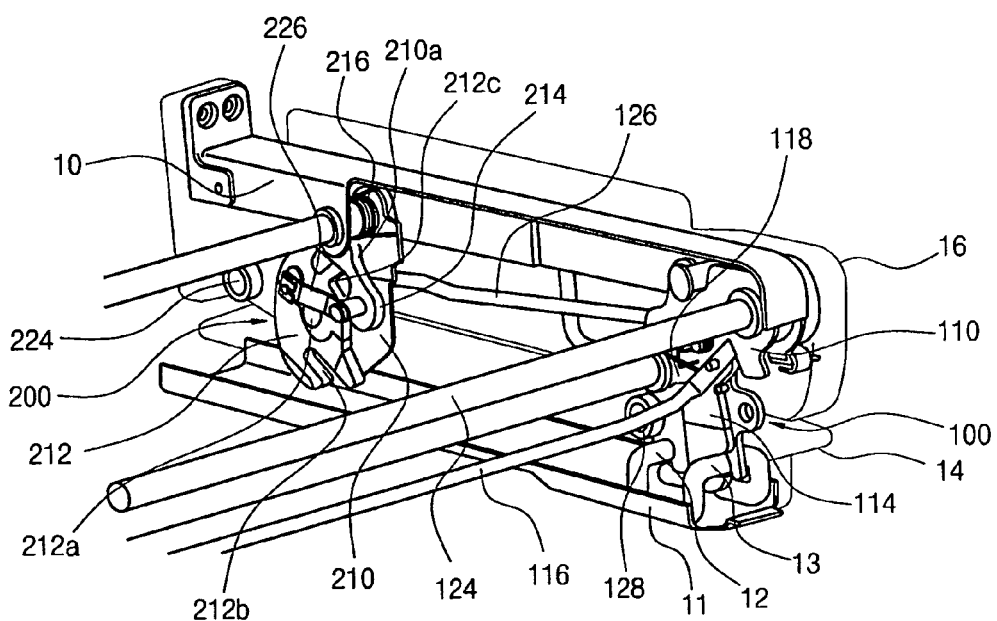
Figure 3A:
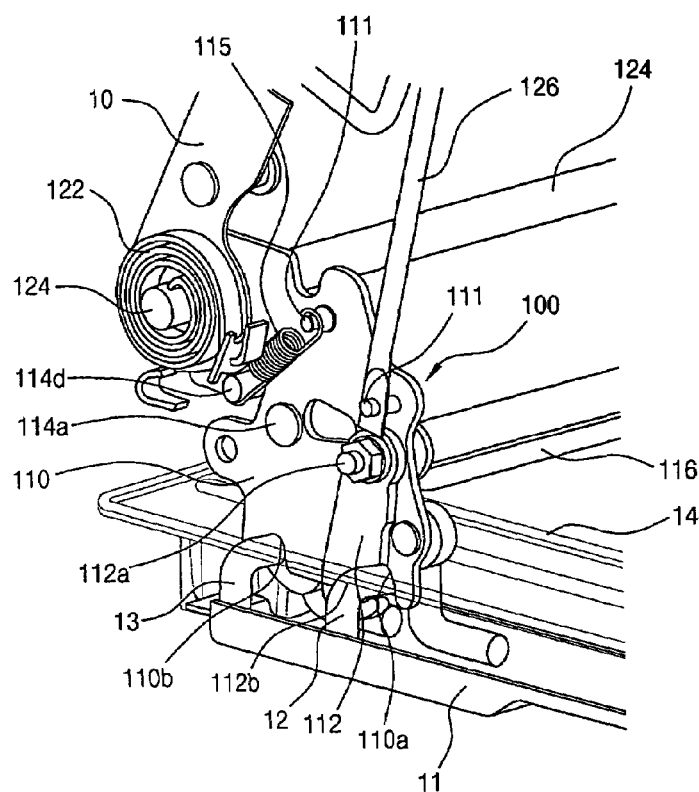
FIG. 3A is a perspective view illustrating a state where a front end locking part is outwardly enlarged in a locking device according to the present invention.
Figure 3B:
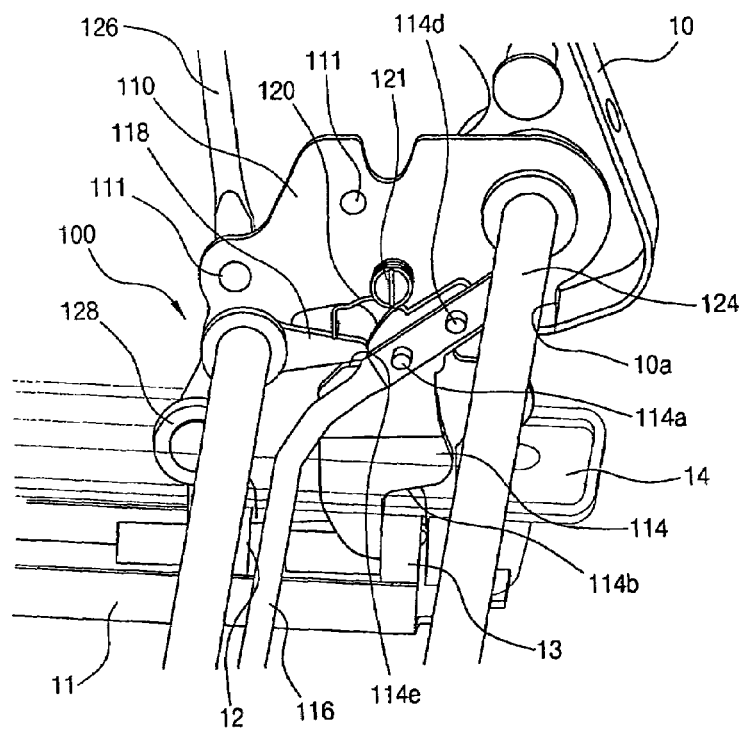
FIG. 3B is a perspective view illustrating a state where a front end locking part is inwardly enlarged in a locking device according to the present invention.

FIGS. 2A and 2B are perspective views illustrating a locking device according to the present invention, and FIG. 3A is a perspective view illustrating a construction where a front end locking part is outwardly enlarged in a locking device according to the present invention. FIG. 3B is a perspective view illustrating a construction where a front end locking part is inwardly enlarged in a locking device according to the present invention.

FIGS. 3A and 3B shows a locking completion state of the front end locking part 100, namely, a state where the first and second lock plates 112 and 114 are locked by the strikers 12 and 13, respectively. The leg frame 10 is forwardly folded. Namely, FIGS. 3A and 3B are views illustrating the front locking part 100 in a state of FIG. 4C.

The front locking part according to the present invention is described hereunder. In the descriptions of the present invention, the front and rear sides of the space are divided with respect to the seat. Two strikers 12 and 13 are fixedly installed in the vehicle body floor panel by a separate bracket 11. The two strikers 12 and 13 are installed in the front and rear sides of the inner horizontal surface of the striker cover 14 fixedly installed by the bracket 11.

In the present invention, the strikers 12 installed in the rear side are collectively called a first striker, and the strikers 13 installed in the front side are called a second striker for simplification. The front main bracket 110 supporting the leg frame 10 on the strikers 12 and 13 is installed in the leg frame 10 of the lower side of the seat and is rotatable at a certain angle. Two recesses 110a and 110b are formed in the front main bracket 110 wherein the strikers 12 and 13 are respectively inserted into the recesses 110a and 110b.

Here, the front main bracket 110 is caught by the engaging step 10a of FIG. 3B formed in the front end side of the leg frame 10 at the front most rotation position in a state that it is forwardly rotated about the rotation center (rotation rod, 124). In addition, a first lock plate 112 is rotatably installed in an outer side of the front main bracket 110 for catching the first striker 12. A second lock plate 114 is rotatably installed in an inner side of the front main bracket 110 for catching the second striker 13.

The two lock plates 112 and 114 are designed to catch the strikers 12 and 13, respectively, in the opposite directions. The first lock plate 112 catches the first striker 12 from the front side to the rear side, and the second lock plate 114 catches the second striker 13 from the rear side to the front side. Reference numeral 112a of FIG. 3A represents a rotation center of the first lock plate 112 positioned in the upper end, and reference numeral 114a of FIG. 6B represents a rotation center of the second lock plate positioned in the upper end.

In the second lock plate 114, a second return spring 115 is installed between the front main bracket 110 in an upper side of the rotation center 114a, and the second return spring 115 is installed in the outside of the front main bracket 110 and is installed between a spring fixing pin 111 protruded from an outer surface of the front main bracket 110 and the spring fixing pin 114d of the second lock plate 114 protruded in the outside of the front main bracket 110 in a state that it is inserted in a pin groove 110c of the front main bracket 110. In particular, the spring fixing pin 111 of the front main bracket 110 is positioned in the front side with respect to the rotation center 114a of the second lock plate 114, and the spring fixing pin 111 of the second lock plate 114 is positioned in the rear side with respect to the rotation center 114a. The second return spring 115 installed between two fixing pins 111 and 114d is provided in the upper side with respect to the rotation center. Therefore, an elastic recovery force of the second return spring 115 is applied in such a manner that the second lock plate 114 is rotated in the counterclockwise direction of FIG. 3B, namely, in the direction that the striker 13 is caught.

In FIG. 3B, reference numeral 111 represents a position that the spring fixing pin of the front main bracket 110 is installed, and reference numeral 114d represents a position that the spring fixing pin of the second lock plate 114 is installed. In particular, the end of a release lever 116 is fixed at the spring fixing pin 114d of the second lock plate 114. An elastic recovery force of the second return spring 115 is applied as a force pulling an end of the release lever 116. One end of the release lever 116 is fixed in the rotation center of the second lock plate 114 and in an inner surface of the same.

An engaging step 114e is formed in an upper side of the second lock plate 114 in such a manner that a front end of the cap 118 rotating together with the first lock plate 112 is caught thereby in the inner side of the front main bracket 110. The cam 118 is downwardly pressed by the first return spring 120 of the upper side installed in the inner side of the front main bracket 110, so that the front end of the cam 118 closely contacts with the engaging step 114e of the second lock plate 114. In particular, the cam 118 positioned in the inner side of the front main bracket 110 is fixed to the rotation center 112a of the first lock plate 112 positioned in the outside of the front main bracket 110 and is rotatable together with the first lock plate 112.

Therefore, the force that the other end of the first return spring 120 downwardly presses the cam 118 becomes a force that the locking state of the first lock plate 112 is maintained in a state that one end of the first return spring 120 is fixed to the spring fixing pin 121 formed in the inner side of the front main bracket 110. Namely, the cam 118 is rotated in the clockwise direction of FIG. 3B by the spring force, and the first lock plate (112 of FIG. 3B) is rotated in the clockwise direction (in the counterclockwise direction in FIG. 3A) of FIG. 3B. In a locking state, the rotation force of the cam 118 is applied as a force for thereby getting closer to the engaging step 114e of the second lock plate 114, and the rotation force of the first lock plate 112 is applied as a locking force with the first striker 12.

Since the front end of the cam 118 presses the second lock plate 114 by the first return spring 120, the force of the first return spring 120 is applied to the locking force of the second lock plate 114, but the main locking force of the second lock plate 114 corresponds to the pulling force of the second return spring 115. The catching states of the first lock plate 112 and the second lock plate 114 are maintained by each spring force even when the strikes 12 and 13 are escaped from the locking grooves 112b and 114b of the plates 112 and 114.

Reference numeral 122 represents a spiral spring allowing the leg frame 10 to be double-folded, namely, to be forwardly tilted after the first and second lock plates 112 and 114 are locked. The center of the inner side of the spiral spring is connected with the end of the rotational rod 124 connected between the main brackets 110 of the front end locking part of the left and right sides of the seat, and the other end of the outer side is fixed to a lower portion of the front end of the leg frame 10.

The spiral spring 122 allows the leg frame 10 to be double-folded when the locking state of the rear end locking part 200 is unlocked from the locking state (locking state of the first and second lock plates) of the front end locking part 100 and maintains the double-folded state of the leg frame 10. In the locking device according to the present invention, the double folding operation that is impossible in the conventional art is possible by the spiral spring 122 together with the front end locking part 100.

Both ends of the rotational rod 124 are fixed to the front main bracket 110 through each front main bracket 110 of the front end locking part 100 of the left and right sides. Both ends of the same are outwardly protruded through the leg frames 10 of the left and right sides. The rotational rod 124 is the rotational center of the front main bracket 110 and is a hinge center of the leg frame 10.

Next, the front main bracket 110 is connected with the rear main bracket 210 of the rear end locking part 200 through a connection bar 126, and the rear main bracket 210 of the rear end locking part 200 cooperates with the front main bracket 110 of the front end locking unit 100 through the connection bar 126. One end of the connection bar 126 is hinged to a hinge pin 111 protruded from an outer surface of the front main bracket 110 of the front end locking unit 100 and is rotatable at the front main bracket 110, and the other end of the same is engaged to a guide pin 211 protruded from an outer surface of the rear main bracket 210 of the rear side as shown in FIGS. 10A, 10B and 12.

In particular, the connection bar 126 allows the rear main bracket 210 to be forwardly folded during the double folding or detachment of the seat. The above role and operation will be described in more detail later when the rear end locking part is described.

Reference numeral 128 represents a front roller installed in one rear side of the front main bracket 110. The roller 128 helps an easier movement after the seat is assembled or detached together with the roller 224 of the rear end locking part 200.

The striker cover 14 has a tilted surface 14b provided in a surrounding portion of the locking parts 100 and 200 and guides the rollers 128 and 224 of the detachable seat to move and enhances its outer appearance. The above operations are the same as for conventional locking devices.

Figure 4A:
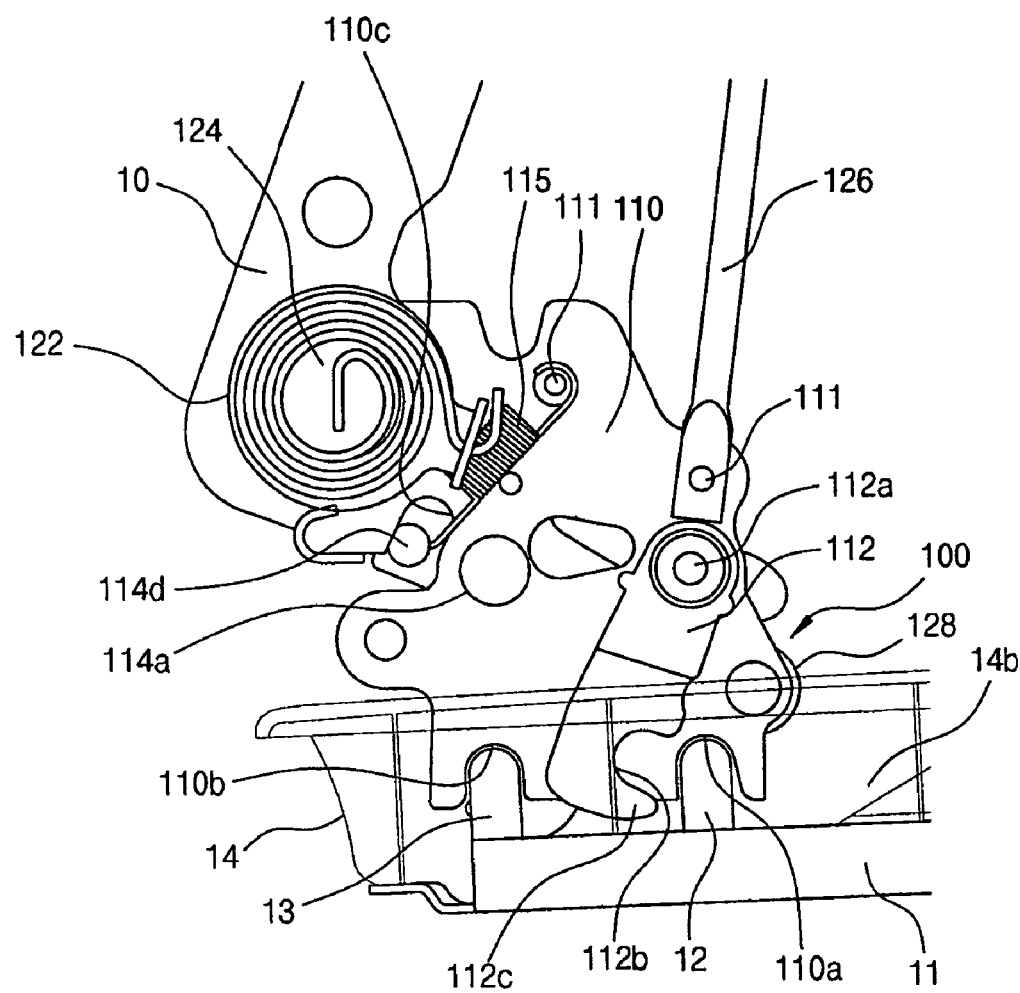
FIG. 4A is a lateral view illustrating a state where a first lock plate is unlocked by a lever operation in a front end locking part of FIG. 6A.
Figure 4B:
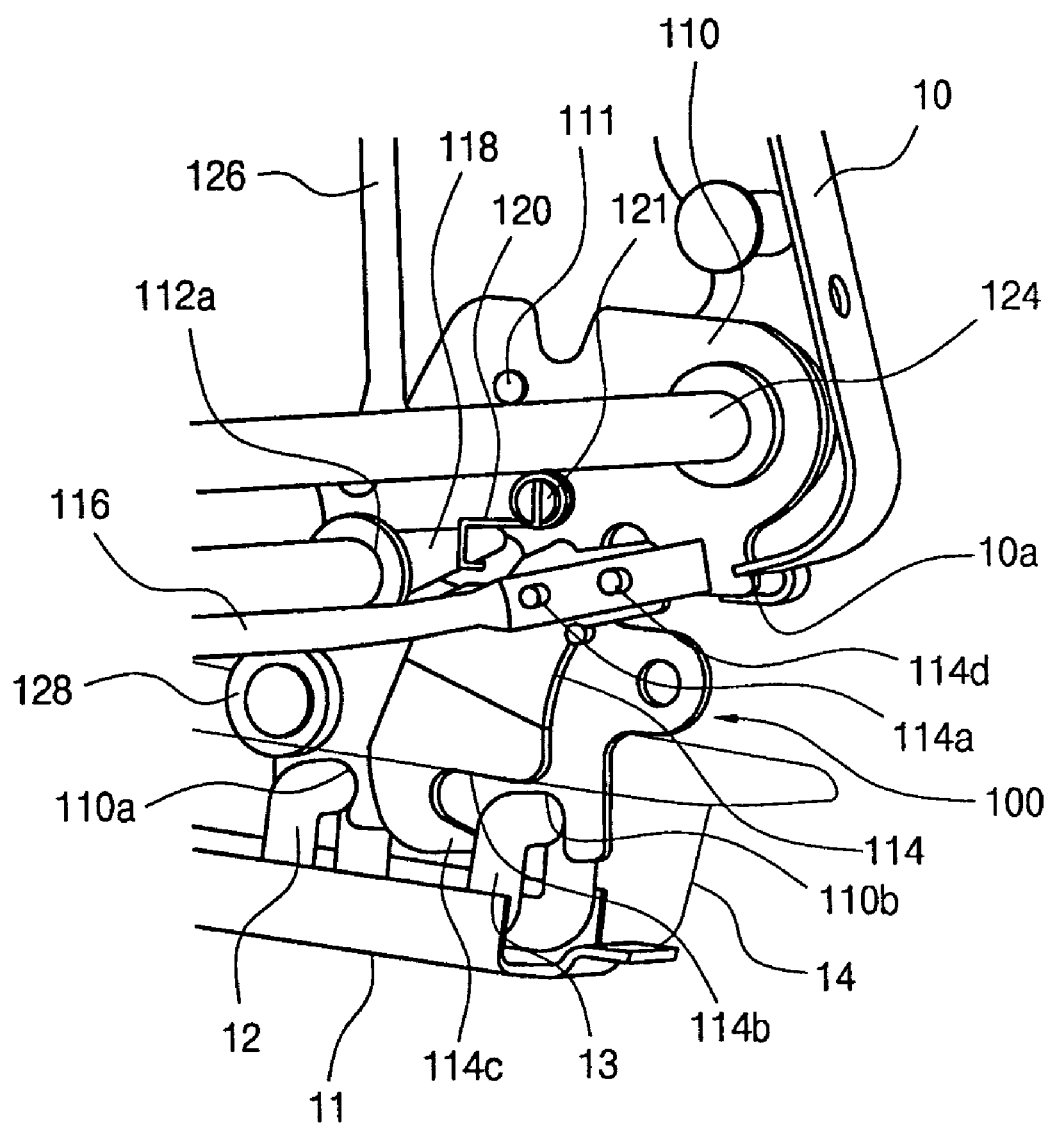
FIG. 4B is a perspective view illustrating a state where a second lock plate is unlocked by a lever operation of a front end locking part of FIG. 6B.

FIGS. 4A and 4B are views illustrating an unlocking state of the front end locking part, of which FIG. 4A is a lateral view of a state where the first lock plate is unlocked in the front end locking part of FIG. 3A, and FIG. 4B is a perspective view of a state where the second lock plate is unlocked in the front end locking part of FIG. 3B. In particular, the operation states of FIGS. 4A and 4B correspond to the state during the unlocking lever operation. The above operation state will be described in detail later.

Next, the rear end locking part of the locking device according to the present invention will be described. The rear end locking part 200 of the locking device according to the present invention has a function capable of indicating a locking state so that the user can visually check the locking or unlocking state from the outside.

Basically, the rear end locking part 200 has a function of locking with respect to the rear striker 15. It has a rear main bracket 210 for supporting the leg frame 10 on the striker 15, a lock plate 212 for catching and locking the striker 15, and a cam 214 for restricting the rotation of the lock plate 212.

Figure 5A:
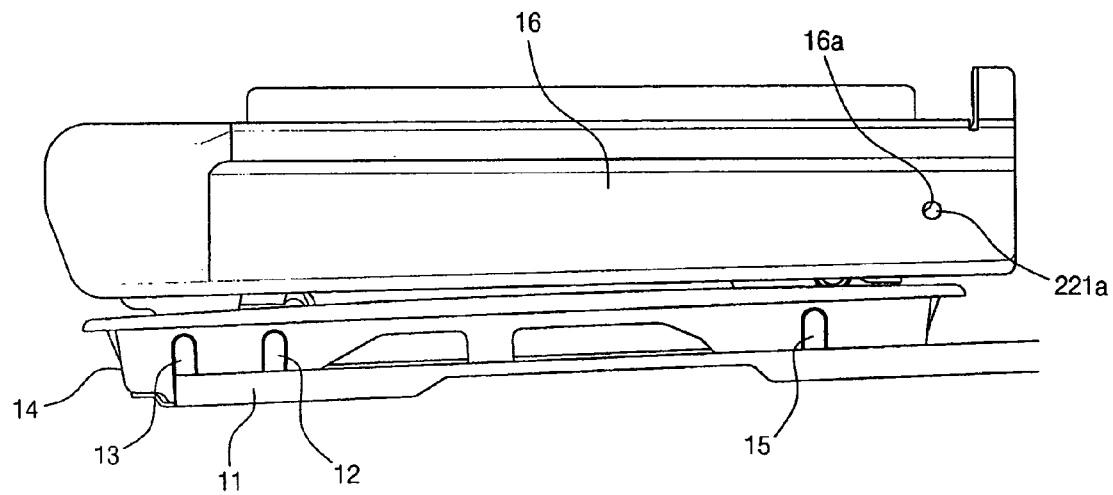
FIGS. 5A and 5B are lateral views illustrating a leg cover having a locking state in a detachable seat adapting a locking device according to the present invention.
Figure 5B:
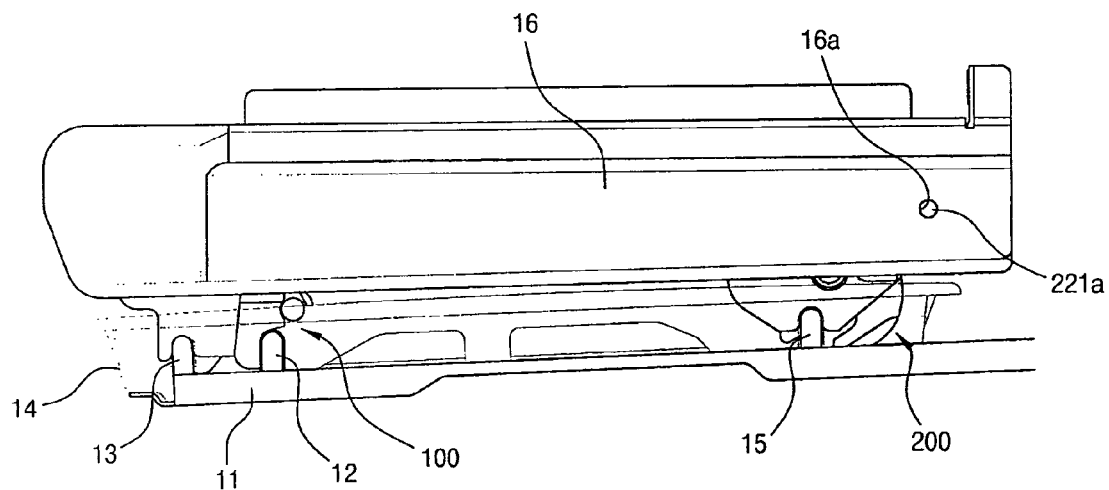

FIGS. 5A and 5B are lateral views of a leg cover of a detachable seat adapting a locking device according to the present invention. In particular, it is possible to indicate the locking state in colors via an indication hole 16a of the leg cover 16 installed outside the leg frame.

FIG. 5A is a view of a locking state of the rear end locking part 200, and FIG. 5B is a view of an unlocking state of the same. In the locking state, a green color is indicated in the indication hole 16a as shown in FIG. 5A, and in the unlocking state, a red color is indicated in the indication hole 16a as shown in FIG. 5B. Namely, the user can check the locking state by colors, i.e., when a red color is indicated in the indication hole 16a, it indicates the unlocking state.

Figure 6:
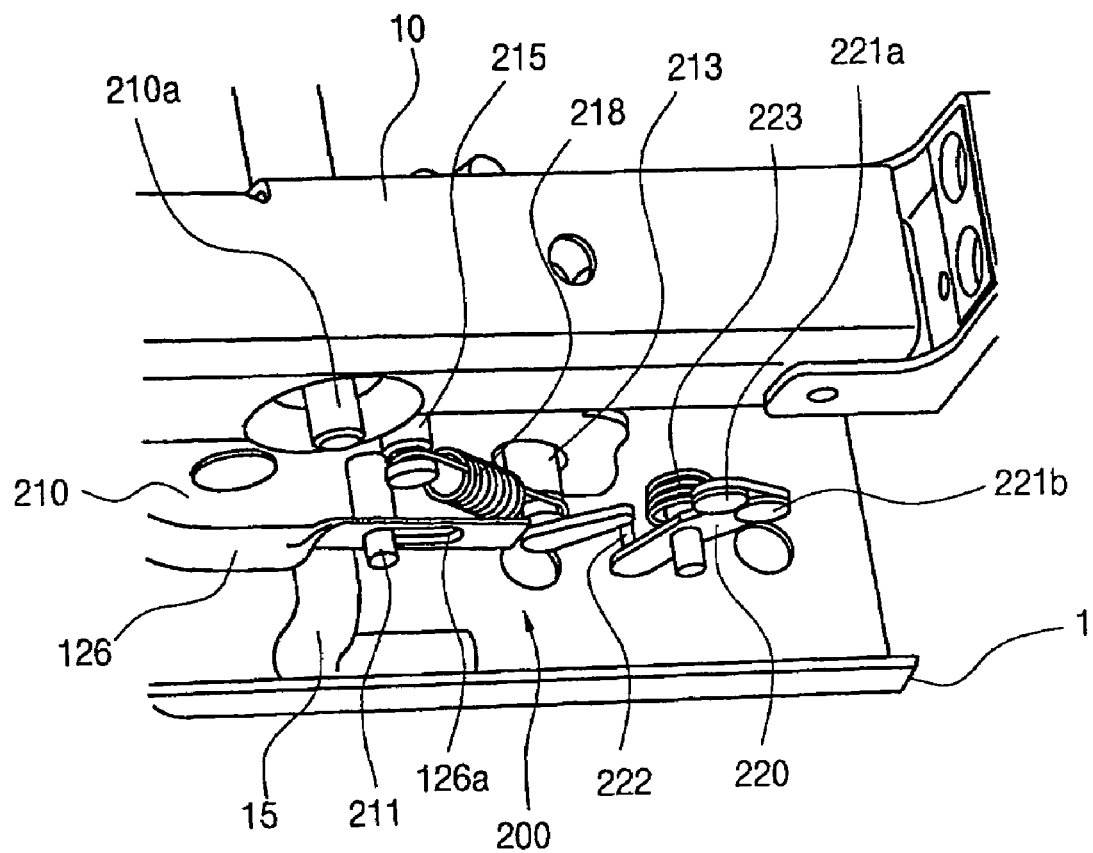
FIG. 6 is a perspective view illustrating a locking state when a rear end locking part is viewed from an upper side in a locking device according to the present invention.
Figure 7A:
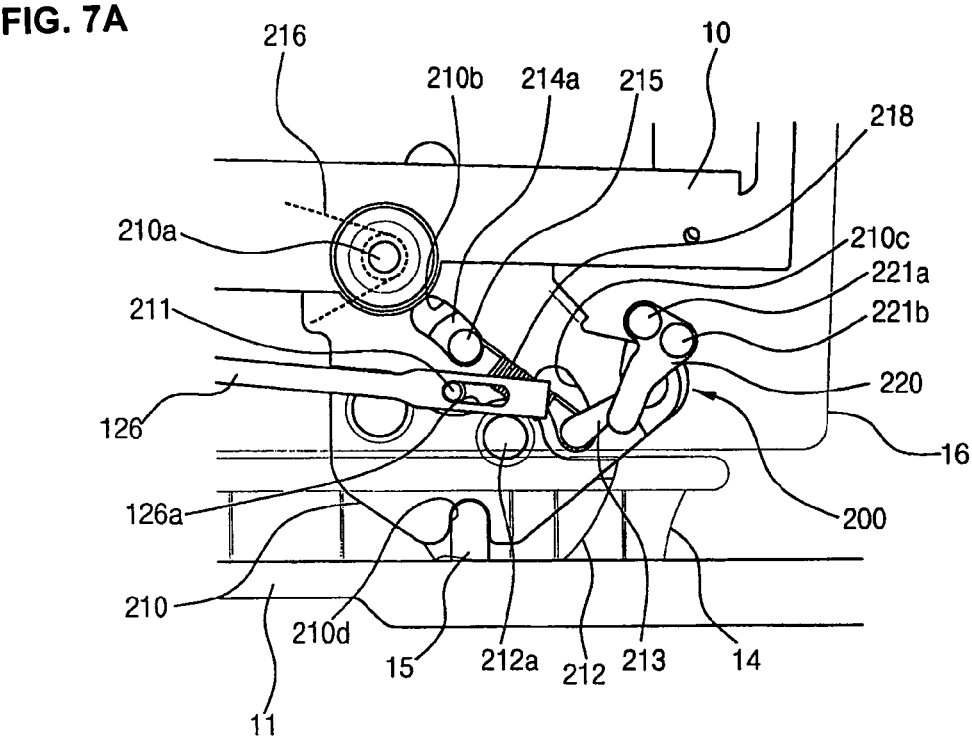
FIGS. 7A and 7B are lateral views when a rear end locking part is viewed from an outer side in a locking device according to the present invention.
Figure 7B:
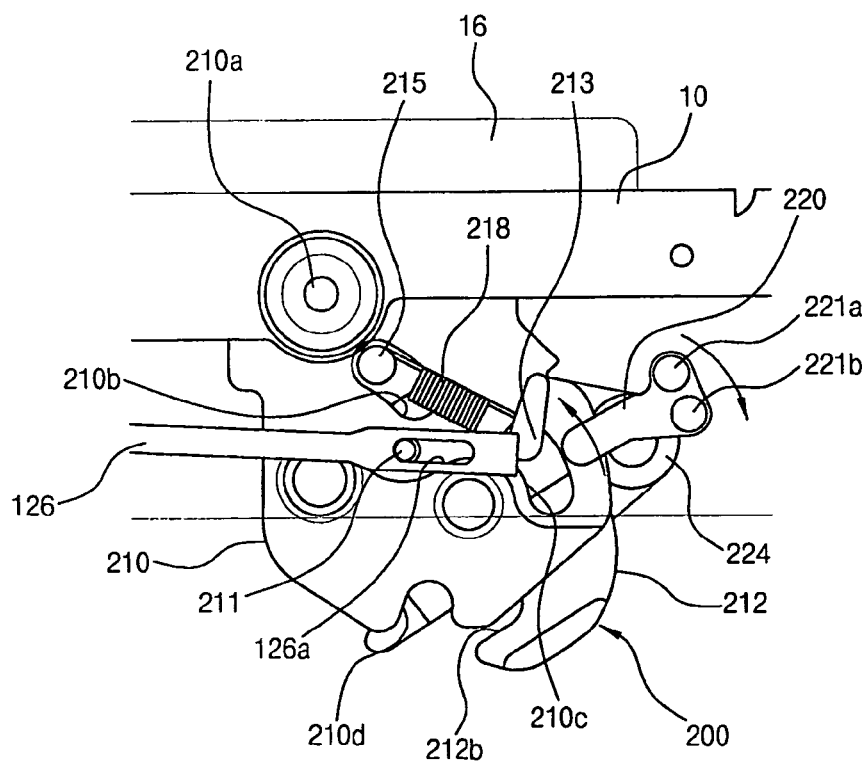

FIG. 6 is a perspective view of a locking state when viewing the rear end locking part from the upper side in the locking device according to the present invention. FIGS. 7A and 7B are lateral views when the rear end locking part is viewed from the outside.

Figure 8A:
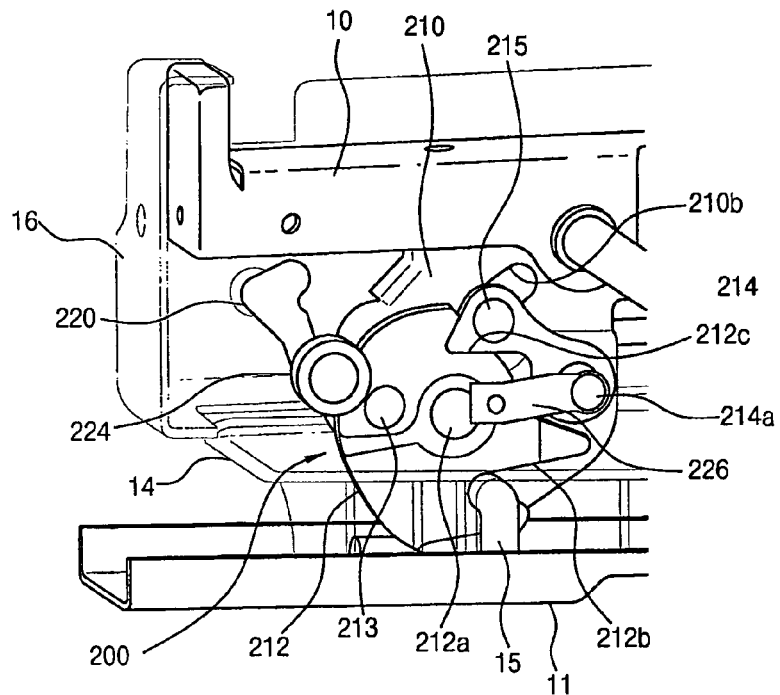
FIG. 8A is a perspective view illustrating a locking state when a rear end locking part is viewed from an inner side in a locking device according to the present invention.

FIG. 8A is a perspective view of a locking state when viewing the rear end locking part from the inner side. FIG.

8B is a perspective view of the unlocking state when viewing the rear end locking part from the inner side.

Figure 9:
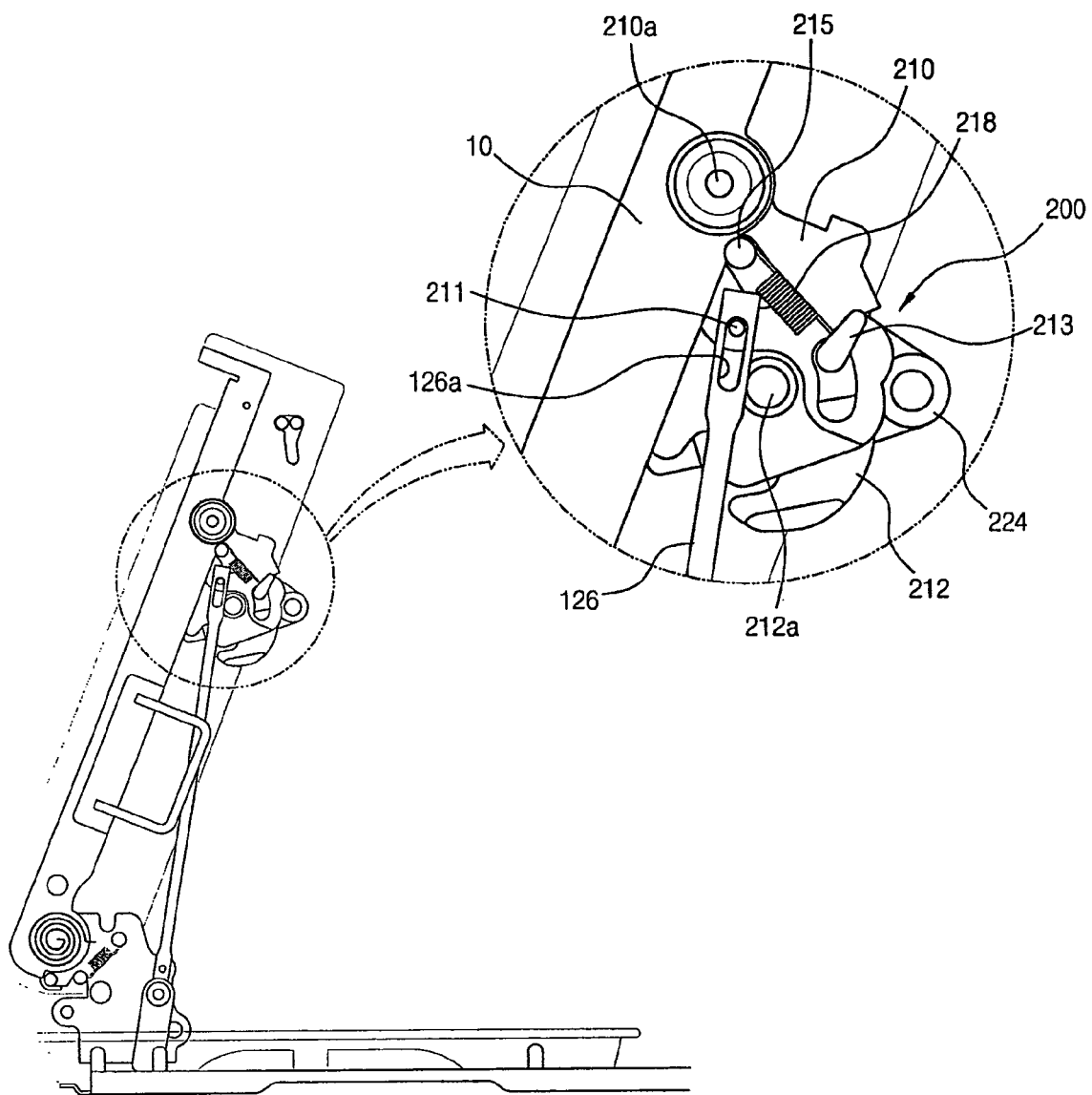
FIG. 9 is a lateral view illustrating a forwardly tilted state of a rear side main bracket in a double-folded state according to the present invention.

FIG. 9 is a lateral view illustrating a forward tilted state of the rear end locking part in the double-folded state.

Here, FIG. 7A shows a locking state, and FIG. 7B shows an unlocking state. The rear end locking part 200 will be described. An upper end of the rear main bracket 210 is rotatably engaged to the leg frame 10, and the engaged portion becomes a rotation center of the rear main bracket 210.

A guide pin 211 is outwardly protruded from an outer side of the rear main bracket 210. Here, the guide pin 211 is installed for engagement with the connection bar 126 connected from the front end locking part 100 and is fitted into an elongated hole 126a formed in a rear end of the connection bar 126. As the connection bar 126 is positioned in the front and rear portions and is moved, the guide pin 211 is guided in the elongated hole 126a of the connection bar 126.

The connection bar 126 is installed in such a manner that the main bracket (referred to as rear main bracket 210) of the rear end locking part 200 is rotated in cooperation with the rotation of the main bracket (referred to as front main bracket 110) of the front end locking part 100. Namely, the connection bar 126 allows the rear end locking part 200 to rotate based on the rotation of the front end locking part 100.

The rear main bracket 210 is forwardly tilted in the leg frame 10 with respect to the rotation center. The rear main bracket 210 is forwardly tilted in such a manner that the front main bracket 110 is rotated, and the connection bar 126 forwardly pulls the rear main bracket 210 through the guide pin 211. (When the seat is double folded, namely, the state is changed from FIG. 1D to FIG. 1C, the front main bracket performs a relative rotation in the clockwise direction up to the maximum front rotation position with respect to the leg frame.)

FIG. 9 shows a state that the rear locking part 200 is forwardly tilted by the connection bar 126. The rear main bracket 210 is backwardly tilted (returning operation, namely it is rotated in the counterclockwise direction with respect to the leg frame when viewing from the outside) in such a manner that the front main bracket 110 is rotated, and the connection bar 126 pushes the rear main bracket 210 through the guide pin 211 (in the change of state from FIG. 1C to FIG. 1D, the front main bracket is rotated in the counterclockwise direction with respect to the leg frame).

FIG. 7C shows a state that the rear main bracket 210 is returned by the connection bar 126. As shown in FIGS. 9 and 7B, the connection bar 126 is installed in the two brackets 110 and 210, so that the rear main bracket 210 is forwardly folded or unfolded based on the forward or backward rotation of the front main bracket 110.

A return spring (216 in FIG. 2B, and a hidden line in FIG. 7A) is installed between the rear main bracket 210 inside the leg frame 10 at the rotation center 210a of the rear main bracket 210. One end of the return spring 216 is connected with an inner side of the leg frame 10, and the other end of the same is connected with the rear main bracket 210. An elastic recovery force of the return spring 216 allows the rear main bracket 210 to rotate in the counterclockwise direction as shown in FIG. 7A.

The connection bar 126 pushes the rear main bracket 210 in the backward direction, and the elastic recovery force of the return spring 216 backwardly recovers the rear main bracket 210 in the forwardly tilted state.

In the backward recovery state, the rear main bracket 210 is engaged with the striker 15. A recess 210d is formed in the lower side of the rear main bracket 210 wherein the striker 15 is inserted thereinto at the recovered rotation position. In a state that the striker 15 is fitted into the recess 210d, the rear main bracket 210 supports the leg frame 10 from the striker 15.

Figure 8B:
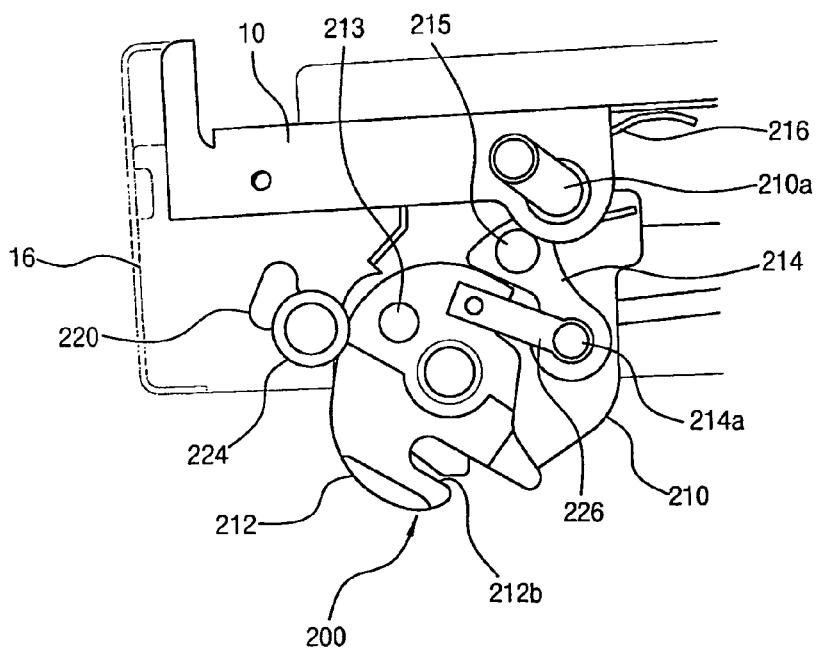
FIG. 8B is a perspective view illustrating an unlocking state when a rear end locking part is viewed from an inner side in a locking device according to the present invention.

As shown in FIGS. 8A and 8B, the lock plate 212 of the rear locking part 200 is rotatable with respect to the rotation center 212a on the inner side of the rear main bracket 210. A recess 212b is formed in a lower side wherein the striker 15 is inserted thereinto. An engaging step 212c is formed in an upper side for thereby catching the cam 214.

The cam 214 is rotatably installed near the lock plate 212 for limiting the rotation of the lock plate in the lock state.

The cam 214 is installed in such a manner that it is rotatable with respect to the rotation center 214a on the inner side of the rear main bracket 210.

One end of the release lever 226 is fixed to the rotation center 214a of the cam 214 so that the user can handle. When the release lever 226 is upwardly pulled and is rotated in the clockwise direction as shown in FIG. 11A, the cam 214 is rotated in the same direction.

A spring fixing pin 215 is installed in the front end of the cam 214 wherein it is fitted into the first guide hole 210b of the rear main bracket 210 and is protruded from the rear main bracket 210. A lock plate pin 213 is installed in one side of the lock plate 212 wherein it is fitted into a second guide hole 210c of the rear main bracket 210 and is protruded from the rear main bracket 210.

The spring fixing pin 215 is guided along the first guide hole 210b based on the rotation of the cam 214, and the lock plate pin 213 is guided along the second guide hole 210c based on the rotation of the lock plate 212.

The return spring 218 is installed between the spring fixing pin 215 and the lock plate pin 213. Here, an elastic recovery force of the return spring 218 operates as a force for rotating the lock plate 212 to a state before catching from the state separated from the recess 212b of the lock plate 212.

In FIGS. 8A and 8B, reference numeral 215 represents an installation position of the spring fixing pin, and 213 represents an installation position of the lock plate pin. A front end of the lock plate pin 213 pushes the lower pin 222 of the indication bracket 220 when it is rotated to the locking state, namely, in a state that the lock plate 212 catches the striker 15.

The indication bracket 220 is rotatably installed near the indication hole 16a even in the leg cover 16. Red and green circular indication parts 221a and 221b are provided in the outer side of the indication bracket 220 facing the inner side of the leg cover 16.

A return spring 223 is installed between the indication bracket 220 and the leg cover 16 at the rotation center of the indication bracket 220. The indication bracket 220 maintains the rotation state of FIG. 7B by the recovery force of the return spring 223 when an external force is not applied. At this time, the position of the indication hole 16a of the leg cover 16 is determined so that the red circular indication part 221a is viewed through the indication hole 16a of the leg cover 16.

In the drawings, reference numeral 224 represents a rear roller installed in one side of the rear main bracket 210.

The operations of the present invention will be described with reference to the accompanying drawings.

FIG. 1A shows a state before the seat is engaged, and the roller 128 installed in the front main bracket 110 of the front end locking part 100 for engaging the seat is positioned in the inclined surface 14b of the striker cover in the rear side of the first striker 12. Here, the front main bracket 110 is positioned at the maximum forward rotation position by the spiral spring 122 with respect to the leg frame 10. The spiral spring 122 is shown in FIGS. 2A, 3A and 4A.

As shown in FIG. 3B, in the maximum forward rotation position, the front main bracket 110 is caught by the engaging step 10a of the front side of the leg frame 10, so that the forward rotation is limited. FIG. 3B shows a state that the leg frame 10 is lifted up, namely, a state of the double folding. In the state of FIG. 1A, the maximum forward rotation state of the front main bracket 110 is the same as the states of FIGS. 1B and 1C.

As shown in FIG. 1A, the rear end locking part 200 is pulled forwardly by the connection bar 126 and maintains a forward tilted state. At this time, the first lock plate 112 and the second lock plate 114 of the front end locking part 100 maintain the catching state until they are locked with the strikers 12 and 13.

As shown in FIG. 3B, the first lock plate 112 maintains a catching state by the force of the first return spring 120 pressing the cam 118 as shown in FIG. 3B. The second lock plate 114 maintains a catching state as shown in FIG. 3B by the force that the second return spring 116b of FIG. 3A installed between the main brackets 110 pulls.

FIGS. 3A and 3B are views illustrating a state that the lock plates 112 and 114 directly catch the strikers 12 and 13. FIG. 1A shows a state before locking. In this state, since the front end locking part 100 is separated from the strikers 12 and 13, the usual catching states of the lock plates 112 and 114 are maintained in on the assumption that there are not strikers as shown in FIGS. 3A and 3B.

In the state of FIG. 1A, since the rear end locking part 200 is in a state before the locking, the red color is indicated in the indication hole 16a of the leg cover 16 as shown in FIG. 5B, and the red indication continues until the state of FIG. 1D. The state of the rear end locking part 200 is the same as the state of the double folding of FIGS. 1C and 9.

When the sear is forwardly pushed in the state of FIG. 1A, the first lock plate 112 is automatically locked by the first striker 12 and becomes the state of FIG. 1B. FIG. 1B shows a state that the first lock plate 112 catches the striker 12, namely, the locking of the first lock plate 112 is completed.

In the procedure changed to the state of FIG. 1B, when the user pushes the seat forwardly, the front roller 128 is moved along the inclined surface 14b of the striker cover 14, while it is moved along the inclined surface of the roller 128, the first striker 12 contacts with the lower inclined surface 112c of the first lock plate 112, and the first striker 12 is fitted into the recess 112b of the first lock plate 112.

When the first striker 12 is fitted into the recess 112b of the first lock plate 112, the first lock plate 112 is returned to the catching state by the force of the first return spring 120 generated when the first lock plate 112 presses the cam 118 after it is fitted into the recess 112b of the fist lock plate 112. Therefore, the first lock plate 112 catches the striker 12.

In the above change procedure, the first striker 12 pushes the lower inclined surface 112c of the first lock plate 112 by the force that the user pushes the seat and is moved into the recess 112b. At this time, the first lock plate 112 is quickly rotated, overcoming the force of the spring 118 that presses the cam 118 and then catches the first striker 12.

FIG. 1C is a view showing a state that the second lock plate 114 catches the strikers 13, namely, a state that the locking of the second lock plate 114 is completed. In the state of FIG. 1C, the first and second lock plates 112 and 114 catch the strikers 12 and 13. Namely, the locking of the front end locking part 100 is completed.

The changes from FIG. 1B to FIG. 1C will be described. In a state that the first lock plate 112 catches the first striker 12, when the user lifts up the seat, and presses the second lock plate 114 of the front end locking part 100, so that the second lock plate 114 catches the second striker 13.

When the user presses the second lock plate 114, the second striker 13 contacts with the inclined surface 114c of the second lock plate 114, and the second lock plate 114 is rotated in the counterclockwise direction, and the second striker 13 is fitted into the recess 114b of the second lock plate 114.

The second lock plate 114 is quickly returned to the catching state by the elastic recovery force of the second return spring (115 of FIG. 3A) after the second strikers 13 is fitted into the recess 114b of the second lock plate 114. The second lock plate 114 maintains a state that the striker 13 is caught.

In the above procedure, the second striker 13 pushes the lower inclined surface 114c of the second lock plate 114 by the force that the user presses and is moved into the locking groove. At this time, the second lock plate 114 extends the second return spring 115 and is quickly rotated and is returned by the elastic recovery force of the second return spring 115 and catches the second striker 13.

The locking procedure of the front end locking part 100 is formed of a locking step of the first lock plate 112 of FIG. 1B and a locking step of the second lock plate 114 of FIG. 1C. All locking procedures of the front end locking part 100 are automatically performed by the operation that the user pushes and lifts up the seat. Here, the angles of the lower inclined surfaces 112c and 114c of the first and second lock plates 112 and 114 are determined in consideration with the front and rear positions and heights of the strikers 12 and 13 and the structure of the inclined surface 14b of the striker cover 14 so that the locking procedure is automatically performed when the seat is pushed and lifted up.

FIG. 1D is a view of a state that the locking of the rear end locking part 200 is completed. The entire seat is fully fixed to the vehicle body by the front and rear end locking parts 100 and 200, and the seat engaging procedure is finished. In the procedure changed to the state of FIG. 1D, the user rotates the rear side of the seat in the downward direction and quickly presses so that the striker 15 is fitted into the recess 210d of the main bracket of the rear end locking part 200, so that the strikers 15 pushes the lock plate 210 of the rear end locking part 200 and is moved into the recess 212b. At this time, the lock plate 212 pulls the return spring (218 of FIG. 7B) and is rotated in the counterclockwise direction of FIG. 8B (counterclockwise direction in FIG. 7B), so that the return spring 218 pulls the front end of the cam 214, and the front end of the cam 214 is caught by the engaging step 212c of the lock plate 212, and the lock plate 212 catches the striker 15 as shown in FIGS. 7A and 8A.

At this time, the cam 214 is caught by the engaging step 212c of the lock plate 212 for thereby limiting the rotation of the lock plate 212, so that the locking state is maintained. The lock plate 212 is rotated in the clockwise direction of FIG. 7B, and the lock plate pin 213 pushes the pin 222 of the indication bracket 220 in the lower direction, and the indication bracket 220 is rotated in the counterclockwise direction of FIG. 7B with respect to the rotation center. The green circular indication part 221b is viewed in the indication hole 16a of the leg frame 16 as shown in FIG. 5A.

The detaching operation of the seat is described hereunder. The locking of the rear end locking part 200 is first unlocked. In the states of FIGS. 7A and 8A, the user lifts up the release lever 226, and the cam 214 is rotated in the clockwise direction of FIGS. 8A and 8B and is escaped from the engaging step 212c of the lock plate 212.

At this time, the cam 214 pulls the lock plate pin 213 through the return spring (218 of FIGS. 7A and 7B), and the lock plate 212 is rotated, and the locking state with the striker 15 is unlocked. At this time, the force that the lock plate pin 213 presses the pin 222 of the indication bracket 220 is released, and the indication bracket 220 is rotated in the clockwise direction of FIG. 7B by the elastic recovery force of the return spring 223 installed at the rotation center. The red circular indication part 221a is viewed in the indication hole 16a of the leg cover 16 as shown in FIG. 5B.

In a state that the locking of the rear end locking part 200 is unlocked, when the user releases the seat, the rear side of the seat is lifted up by the elastic recovery force of the spiral spring 122 installed at the front end of the leg frame 10, and the leg frame 10 is automatically tilted and becomes the double-folded state as shown in FIG. 1C.

Here, the spiral spring 122 allows the leg frame 10 to always rotate in the upward direction when the rear end locking part 200 is unlocked.

When the seat is changed to the double-folded state, and the rear end locking part 200 is forwardly tilted by the connection bar 126.

In the locking device according to the present invention, the double-folded state is automatically performed by simply unlocking the rear end locking part 200 as compared to the conventional art in which it is impossible. Therefore, it is possible to store the seat in the double-folded state.

In order to detach the seat, the locking state of the front end locking part is unlocked in the double locking state of FIG. 4C. The above procedure will be described. As shown in FIGS. 4A and 4B, when the release lever 116 of the front end locking part 100 is lifted up, the second lock plate 114 is rotated in the counterclockwise direction together with the release lever 116, and the locking with the striker 13 is unlocked. The second lock plate 114 allows the cam 118 to be lifted up during the rotation. The cam 118 is rotated in the counterclockwise direction, and the first lock plate 112 is rotated in the clockwise direction reverse to the second lock plate 114, and the locking with the striker 12 is unlocked.

When the user fully separates the front end locking part 100 from the strikers 12 and 13, and releases the release lever 116, the second lock plate 114 is rotated in the reverse direction by the elastic recovery force of the second return spring 115 and becomes the catching state. The first lock plate 112 is rotated in the reverse direction by the force of the first return spring 120 that presses the cam 118 and becomes the catching state.

As described above, in the locking device for a detachable vehicle seat according to the present invention, it is easy to attach and detach the seat. In addition, a full detachment and double folding of the seat are possible. There is provided a certain mechanism in the rear end locking part for checking the locking states, so that the user can easily check the locking states.

In the present invention, the double folding is possible in the seat according to the present invention. Therefore, it is not needed to fully separate the seat from the vehicle body and store the same independently outside the vehicle, thus preventing any inconvenience. The getting on/off procedures of the passengers are easier as compared to the conventional art.

In addition, the user can check the full locking states without any mistakes, so that the stability of the seat is significantly enhanced.

Note, that the terms front, rear, left and right refer to the typical orientation of a vehicle.

What is claimed is:

1. A locking device of a detachable vehicle seat, the locking device comprising:
   a leg frame coupled to an underside of a vehicle seat, wherein said leg frame comprises opposing front and rear ends;
   front and rear end locking parts, which respectively comprise a front main bracket and a rear main bracket, where each of said front and rear locking parts is configured to be connected to one or more strikers, wherein said front and rear end locking parts are installed at said front end and said rear end of said leg frame, respectively, and wherein the front end locking part is selectively locked/unlocked to at least one striker of said one or more strikers by means of a plurality of lock plates; and
   a spring member that provides an elastic recovery force to pivot the leg frame about a rotational axis of the front end locking part in a folded state when the rear end locking part is unlocked and the front end locking part is fixedly locked to at least one striker of the one or more strikers;
   wherein said rear end locking part comprises:
      a main bracket installed at a rear end of the leg frame in such a manner that it is rotatable in both forward and backward directions, is foldable in the forward direction and has a recess into which a striker of the one or more strikers is fitted;
      a lock plate which is rotated in said main bracket and locked with the striker by a pushing force being generated as soon as said striker is fitted into one side of the recess of the main bracket, as said striker is fitted into the recess;
      a cam which is rotatably coupled to said main bracket, and is caught by an engaging step of said lock plate, and limits the rotation of said lock plate in the locking state;
      another spring member which is installed between said lock plate and said cam and provides a pulling force for holding a front end of said cam to stay on the engaging step of the lock plate;
      a release lever of which one end is fixedly installed at a rotation center of the cam, wherein said release lever rotates said cam so that the front end of said cam is escaped from the engaging step by rotating it when said lock plate is to be unlocked; and
      a state-indicating part which is operated in cooperation with the rotation of said lock plate and indicates a locking/unlocking state via an indication hole of said leg frame installed at an outside of said leg frame.

2. The locking device of claim 1, wherein said spring member is installed between a spring fixing pin, which is installed at a front end of said cam and inserted and guided in a first guide hole of said main bracket, and a lock plate pin, which is installed at one side of said lock plate and inserted and guided in a second guide hole of said main bracket.

3. The locking device of claim 1, wherein a return spring is provided on the rotational center of said main bracket to provide an elastic recovery force for backward rotation of said main bracket which is already folded in the forward direction between said leg frames.

4. The locking device of claim 1, wherein said state-indicating part is provided in such a manner that an indication bracket is rotatably installed in an inner side of said leg cover near the indication hole and operates in cooperation with rotation of said lock plate, wherein two circular indication parts are installed at one end of said indication bracket with respect to said rotation center on an outer surface facing an inner surface of said leg cover, wherein said two circular indication parts are recognized by colors with each other, and one selected from said two circular indication parts is visible to the outside through said indication hole of said leg cover.

5. The locking device of claim 3, wherein a bracket pin is installed to be protruded from the other end with respect to said rotation center of said indication bracket so that an entire indication bracket is rotated when said lock plate is rotated in the locking state, wherein said bracket pin is pushed by said lock plate pin, and a return spring is installed at the rotation center for providing an elastic recovery force in order to rotate the indication bracket in the reverse direction when a force pushing said lock plate pin by said lock plate is released.

6. The locking device of claim 1, further comprising a connection bar which is installed between said front end locking part and said rear end locking part for cooperating forward and backward rotations of said front end locking part and said rear end locking part.

7. The locking device of claim 6, wherein said one end of said connection bar is connected with a hinge pin installed in said main bracket of said front end locking part, and another end of the same is installed in such a manner that a guide pin installed in said main bracket of said rear end locking part is fitted into an elongated hole.

8. The locking device of claim 1, wherein each of said one or more strikers is fixedly installed inside a cover, and wherein said front end locking part comprises:
said front main bracket coupled to said leg frame and provided with a recess configured to receive at least one striker of the one or more strikers;
at least one of said plurality of lock plate rotatably coupled to said front main bracket, where said at least one lock plate is selectively locked/unlocked to a striker of said one or more strikers by rotating said at least one lock plate relative to said front main bracket as said striker is received into said recess;
an additional spring member, which provides elastic recovery force for biasing said at least one lock plate in a locked state; and
a release lever coupled to said at least one lock plate and configured to rotate said lock plates into an unlocked state.

9. The locking device of claim 8, wherein said front main bracket is provided with a roller which moves along a lower surface of a cover of said one or more strikers.

10. The locking device of claim 8, wherein said at least one lock plate consists of first and second lock plates, each of which is configured to be independently locked/unlocked to a first striker at a front and a second striker at a rear, respectively, for achieving a two-step locking process of said front end locking part.

11. The locking device of claim 10, wherein said first lock plate, which is locked/unlocked to said first striker at the front, is biased into a locked state by an elastic recovery force provided by a first return spring for maintaining a fitted state of both a cam, which is fixed to a rotational axis of said first lock plate, and the front end of said cam in a locked state, and wherein said second lock plate, which is locked/unlocked to said second striker at the rear, is biased into a locked state by an elastic recovery force provided by a second return spring, which is installed between said front main bracket and said second lock plate.

12. The locking device of claim 11, wherein said second return spring is characterized in that, in a state when one end of said second return spring is fixed to a spring fixing pin of said front main bracket, another end of said second return spring elastically supports a front end of said cam in a direction from an upper part to a lower part thereby forcing said front end of said cam to be closely attached to said second lock plate.

13. The locking device of claim 10, wherein said first lock plate and said second lock plate are locked/unlocked to their respective one or more strikers by rotating reversely with each other.

14. The locking device of claim 10, wherein said release lever is characterized in that one end of said release lever is fixed to both a rotational center and an internal surface of said second lock plate and thus said release lever rotates together with said second lock plate during its operation.

15. The locking device of claim 10, wherein said first lock plate is provided with a tilted surface at its lower end so that it rotates and releases a locking state as said first striker is being pushed when said roller moves along said tilted surface, whereby said first lock plate is automatically locked as a roller moves along said tilted surface of a striker cover when the seat is entirely moved forward.

16. The locking device of claim 10, wherein said second lock plate is provided with a tilted surface at its lower end so that it rotates and releases a locking state as said second striker is received, whereby said second lock plate is automatically locked by a downwardly applied force when said first lock plate is in a locked state.

17. The locking device of claim 8, wherein the main bracket of said front end locking part rotates together with a rotation rod on the leg frame because both ends of the rotation rod installed at left and right sides of the seat are fixed to a rotation center of the same, and said spring member is a spiral spring of which an inner end is fixed to an end of said rotation rod, and an outer end is fixed to said leg frame.

18. The locking device of claim 8, wherein said main bracket of said front end locking part is caught by an engaging step formed on the front end of said leg frame and thereby limits rotation of the same in a state when it is maximally rotated in a forward direction by said spring member with respect to a rotation center.

* * * * *